(12) United States Patent
Usami et al.

(10) Patent No.: US 9,848,540 B2
(45) Date of Patent: Dec. 26, 2017

(54) CIRCULAR POLARIZATION ILLUMINATION DEVICE AND PLANT GROWTH REGULATION METHOD

(71) Applicant: FUJIFILM Corporation, Tokyo (JP)

(72) Inventors: Yoshihisa Usami, Ashigarakami-gun (JP); Mitsuyoshi Ichihashi, Ashigarakami-gun (JP); Yohsuke Takeuchi, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/058,992

(22) Filed: Oct. 21, 2013

(65) Prior Publication Data
US 2014/0041295 A1  Feb. 13, 2014

Related U.S. Application Data

(63) Continuation of application No. PCT/JP2012/059970, filed on Apr. 12, 2012.

(30) Foreign Application Priority Data

Apr. 22, 2011  (JP) ................. 2011-095643

(51) Int. Cl.
*A01G 7/04* (2006.01)
*F21V 9/14* (2006.01)

(52) U.S. Cl.
CPC ............... *A01G 7/045* (2013.01); *F21V 9/14* (2013.01); *Y02P 60/146* (2015.11)

(58) Field of Classification Search
CPC .............. A01G 7/04; A01G 7/045; F21V 9/14
(Continued)

(56) References Cited

U.S. PATENT DOCUMENTS 3,876,285 A  4/1975  Schwarzmuller
5,695,268 A * 12/1997  Hagiwara ................ 362/19
(Continued)

FOREIGN PATENT DOCUMENTS

JP  2-283217 A  11/1990
JP  2-283218 A  11/1990
(Continued)

OTHER PUBLICATIONS

English-language translation of JP 2008-228688 A.*
(Continued)

*Primary Examiner* — Lisa L Tsang
(74) *Attorney, Agent, or Firm* — Birch, Stewart, Kolasch & Birch, LLP

(57) ABSTRACT

The present invention provides a circular polarization illumination device which can irradiate right-circularly polarized light at a large light amount from a light source of right-circularly polarized light with a high efficiency and can irradiate left-circularly polarized light at a large light amount from a light source of left-circularly polarized light with a high efficiency, and a plant growth regulation method that can efficiently regulate the promotion or inhibition of the growth of plants by using the circular polarization illumination device. Moreover, the illumination device includes a light-emitting light source, a reflective polarizing plate, reirradiation unit, and circular polarization conversion unit.

7 Claims, 5 Drawing Sheets

(58) Field of Classification Search
USPC ........... 47/1.01 R, 58.1 R, 58.1 LS, 58.1 SE,
47/58.1 FV; 362/19; 359/485.01, 485.03,
359/485.05, 487.01, 487.03, 487.04,
359/489.01, 489.07, 489.08, 489.11,
359/489.15, 490.01, 599
IPC ..................................... A01G 7/04; F21V 9/14
See application file for complete search history.

(56) References Cited

U.S. PATENT DOCUMENTS

| | | | |
|---|---|---|---|
| 5,818,626 A * | 10/1998 | Engstrom et al. | ............ 359/281 |
| 6,362,920 B1 * | 3/2002 | Hannah | .................... 359/489.07 |
| 6,533,427 B2 * | 3/2003 | Chang | ............................ 362/19 |
| 6,710,921 B2 * | 3/2004 | Hansen et al. | ........... 359/485.05 |
| 6,830,339 B2 * | 12/2004 | Maximus | ........................ 353/20 |
| 6,853,491 B1 * | 2/2005 | Ruhle | .................. G02B 5/3016 349/11 |
| 2002/0159150 A1 * | 10/2002 | King | .................... G02B 27/283 359/485.05 |
| 2004/0150991 A1 | 8/2004 | Ouderkirk et al. | |
| 2006/0181771 A1 * | 8/2006 | Taira | ............................ 359/494 |
| 2011/0115385 A1 * | 5/2011 | Waumans et al. | ............ 315/152 |
| 2011/0182050 A1 * | 7/2011 | Kanade et al. | ................. 362/19 |
| 2013/0057786 A1 * | 3/2013 | Watson | ............. G03B 21/2033 349/5 |

FOREIGN PATENT DOCUMENTS

| | | | | |
|---|---|---|---|---|
| JP | 2001-133856 A | | 5/2001 | |
| JP | 2001133856 A | * | 5/2001 | |
| JP | 2003-43460 A | | 2/2003 | |
| JP | 2003043460 A | * | 2/2003 | |
| JP | 2004-252082 A | | 9/2004 | |
| JP | 2006-515963 A | | 6/2006 | |
| JP | 2007-222039 A | | 9/2007 | |
| JP | 2008-228688 A | | 10/2008 | |
| JP | 2008228688 A | * | 10/2008 | |
| JP | 2011-508909 A | | 3/2011 | |
| NL | WO-2010004489 A1 | * | 1/2010 | ............ A01G 7/045 |
| WO | WO 2010/004489 A1 | | 1/2010 | |

OTHER PUBLICATIONS

Extended European Search Report dated Oct. 2, 2014, issued in corresponding European Patent Application No. 12774080.1.
International Search Report, dated Jul. 17, 2012, issued in PCT/JP2012/059970.
Written Opinion of the International Searching Authority, dated Jul. 17, 2012, issued in PCT/JP2012/059970.
Notice of Reasons for Rejection issued in the co-pending Japanese Patent Application No. JP2011-095643, dated Aug. 25, 2015, with English translations thereof.
Notification of Reasons for Refusal dated Jul. 4, 2017, issued in corresponding Japanese Patent Application No. 2016-112820, with English translation.

* cited by examiner

> US 9,848,540 B2

CIRCULAR POLARIZATION ILLUMINATION DEVICE AND PLANT GROWTH REGULATION METHOD

CROSS REFERENCE TO RELATED APPLICATIONS

This application is a Continuation of PCT International Application No. PCT/JP2012/059970 filed on Apr. 12, 2012, which claims priority under 35 U.S.C 119(a) to Application No. 2011-095643 filed in Japan on Apr. 22, 2011, all of which are hereby expressly incorporated by reference into the present application.

BACKGROUND OF THE INVENTION

1. Field of the Invention

The present invention relates to a circular polarization illumination device and a plant growth regulation method using the same.

2. Description of the Related Art

It is known that a large difference is exhibited in the growth of plants depending on the quality of light, and for example, the growth is promoted when the plant is cultivated by being irradiated with right-circularly polarized light and is inhibited when it is cultivated by being irradiated with left-circularly polarized light. In order to obtain the circularly polarized light described above, a polarizing plate and a retardation plate need to be used. However, there is a problem that from randomly polarized light, only the light that is half or less of the desired amount of light is obtained in principal.

As the related art, for example, a method of forming right-hand polarized light and left-hand polarized light by a polarization separation element and irradiating light by surrounding one of the light with a shielding plate has been proposed (see JP2008-228688A).

Moreover, when linearly polarized light is irradiated in a certain direction by using an absorptive polarizer, a difference is not exhibited during the irradiation in raising plants (see JP1990-283217A (JP-H02-283217A)).

In addition, a light source as a combination of an LED emitting excitation light and a reflective polarizer has been proposed (see JP2006-515963A). Examples of the reflective polarizer include those containing cholesteric materials, multi-layer polymeric materials, and multi-layer birefringent polymeric materials.

Meanwhile, conventionally, in a plant factory which is a system for planned production of plants in a closed or a semi-closed space having a controlled internal environment, the growth is regulated by adjusting the temperature, fertilizers, time of light irradiation, illuminance, and the like. However, recently, there has been a report regarding a method for promoting growth of plants by means of regulating the quality of light (see JP2007-222039A). Further, a plant growth inhibition method by the irradiation of polarized light has been proposed (see JP1990-283218A (JP-H02-238218A)).

SUMMARY OF THE INVENTION

However, currently, a circular polarization illumination device which can irradiate right-hand polarized light at a large light amount from a light source of right-hand polarized light with a high efficiency, can irradiate left-hand polarized light at a large light amount from a light source of left-hand polarized light with a high efficiency, and can efficiently regulate the growth of plants has not been provided.

The present invention has been made in consideration of the above circumstances, and an aims to solve various conventional problems described above and achieve the following objects. That is, an object of the present invention is to provide a circular polarization illumination device which can irradiate right-hand polarized light at a large light amount from a light source of right-hand polarized light with a high efficiency and can irradiate left-hand polarized light at a large light amount from a light source of left-hand polarized light with a high efficiency, and a plant growth regulation method which uses the circular polarization illumination device and can efficiently regulate the promotion or inhibition of plant growth.

In order to solve the above problems, the present inventors repeated thorough examination. As a result, they found that if a reflective optical element is used for polarization separation to reflect and recycle unnecessary light, right- or left-circularly polarized light at a large light amount is obtained from a light source of right- or left-circularly polarized light with a high efficiency, and the growth of plants can be efficiently regulated by irradiating the plants with the above circularly polarized light. They found that, for example, if right-circularly polarized light at a large light amount is irradiated from a light source of right-circularly polarized light with a high efficiency, the growth of plants can be efficiently promoted, and if left-circularly polarized light at a large light amount is irradiated from a light source of left-circularly polarized light with a high efficiency, the growth of plants can be efficiently inhibited.

The present invention is based on the above knowledge found by the present inventors, and means for solving the above problems are as follows. That is, <1> A circular polarization illumination device including:
 a light-emitting light source;
 a reflective polarizing plate that transmits one of the polarization components of incident light from the light-emitting light source and reflects the other polarization component;
 reirradiation unit for changing a polarization state of the light reflected from the reflective polarizing plate to reirradiate the reflective polarizer with the light; and
 circular polarization conversion unit for converting the light having been transmitted through the reflective polarizing plate into circularly polarized light, <2> The circular polarization illumination device according to <1> further including a member that functions as the reflective polarizing plate and the circular polarization conversion unit at the same time, <3> The circular polarization illumination device according to <1> or <2> further including a birefringent member that can change the polarization state, <4> The circular polarization illumination device according to any one of <1> to <3> further including a scattering member that can change the polarization state, and <5> A plant growth regulation method using the circular polarization illumination device according to any one of <1> to <4> as an irradiation light source.

According to the present invention, various conventional problems can be solved, and it is possible to provide a circular polarization illumination device which can irradiate right-circularly polarized light at a large light amount from a light source of right-circularly polarized light with a high efficiency and can irradiate left-circularly polarized light at a large light amount from a light source of left-circularly polarized light with a high efficiency, and a plant growth regulation method which can efficiently regulate the promotion or inhibition of the growth of plants by using the circular polarization illumination device.

Figure 1:
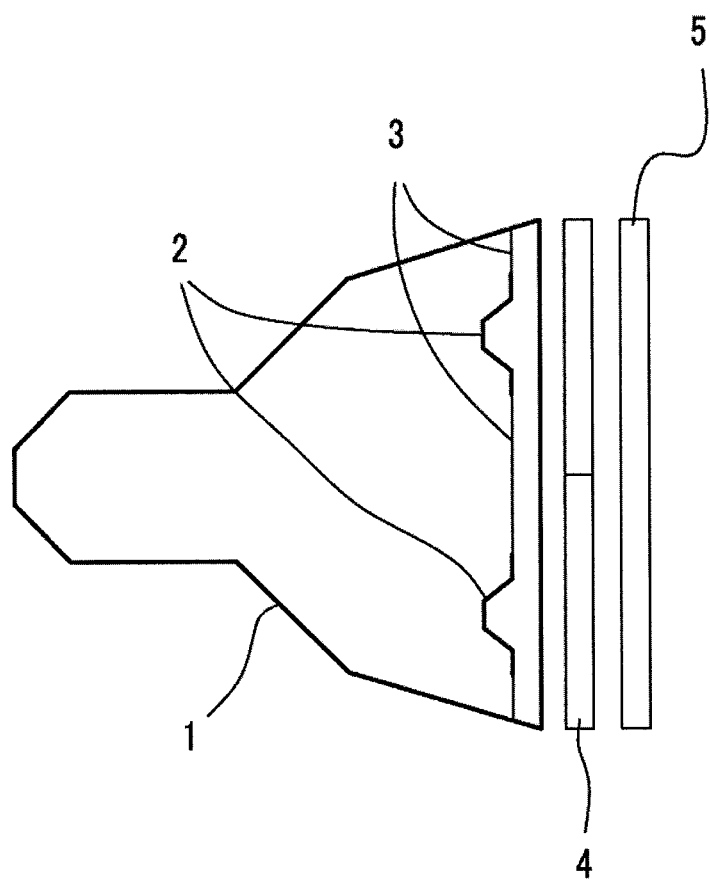
FIG. 1 is a schematic view showing the constitution of a circular polarization illumination device of Example 1.

DESCRIPTION OF THE PREFERRED EMBODIMENTS (Circular Polarization Illumination Device)

The circular polarization illumination device of the present invention has a light-emitting light source, a reflective polarizing plate, reirradiation unit, and circular polarization conversion unit, and optionally further has other unit.

<Light-emitting Light Source>

The light-emitting light source is not particularly limited and can be appropriately selected according to the purpose. Examples thereof include a fluorescent lamp, an LED, a discharge lamp such as a mercury lamp, a tungsten lamp, laser light, an organic light emitting diode (OLED) lamp, a metal halide lamp (meta-halide), a xenon lamp, and the like. Among these, an LED is particularly preferable in view of efficiency.

The light having a wavelength obtained by light emission may be used as is, or the light having been converted by a phosphor may be used.

When the circular polarization illumination device is used for regulating plant growth, it is preferable to use an LED that emits light with a wavelength highly efficient for the growth of plants. Specifically, it is preferable to use a light source having a high energy at either or both of wavelengths of around 460 nm and 660 nm.

<Reflective Polarizing Plate>

The reflective polarizing plate is means for transmitting one of the polarization components of incident light from the light-emitting light source and reflecting the other polarization components.

The reflective polarizing plate is not particularly limited and can be appropriately selected according to the purpose. Examples thereof include (1) a total reflection-type polarizer, (2) a polarizer as a laminate of thin films having different types of birefringence, (3) a wire grid-type polarizer, (4) a thin film-type polarizer, (5) a birefringent polarizer, and the like. Among these, the (2) polarizer as a laminate of thin films having different types of birefringence and (3) wire grid-type polarizer are particularly preferable, in the respect that the size of the circular polarization illumination device can be reduced.

—(1) Total Reflection-type Polarizer—

The total reflection-type polarizer is prepared by combining crystals having optical axes (axial properties of a refractive index). For this reason, the polarizer determines a polarization direction by causing total reflection according to the direction of the incident polarized light and has an extremely high level of polarizing characteristics.

Examples of the total reflection-type polarizer include a Glan-Thompson prism, a Glan-Taylor prism, and the like.

The Glan-Thompson prism is a polarizing prism made of calcite and is a polarizer that produces linearly-polarized light when a non-polarized beam enters this prism.

The Glan-Taylor prism is a polarizing prism made of calcite. This is a polarizer that produces linearly polarized light when a non-polarized beam enters this prism and exhibits excellent transmittance for a short wavelength.

—(2) Polarizer as Laminate of Thin Films Having Different Types of Birefringence—

As the polarizer as a laminate of thin films having different types of birefringence, for example, those described in JP1997-506837A (JP-H09-506837A) can be used.

Specifically, if films are processed under conditions that are selected to obtain the relationship of a refractive index, it is possible to form a polarizer by using a wide variety of materials. Generally, one of the first materials needs to have a refractive index different from that of the second material in the selected direction. The difference in the refractive index can be made by various methods including stretching performed during or after the film formation, extrusion molding, and coating. Moreover, it is preferable that the materials have similar rheological properties (for example, melt viscosity) such that two kinds of materials can be subjected to extrusion simultaneously.

Examples of preferable combinations include a combination of a crystalline or semicrystalline organic polymer as a first material and an organic polymer as a second material. The second material may be crystalline, semicrystalline, or amorphous and may exhibit birefringence that is opposite to that of the first material.

Specific examples of the preferable materials include polyethylene naphthalate (PEN) or isomers thereof (for example, 2,6-, 1,4-, 1,5-, 2,7-, or 2,3-PEN), polyalkylene terephthalate (for example, polyethylene terephthalate, polybutylene terephthalate, or poly-1,4-cyclohexane dimethylene terephthalate), polyimide (for example, polyacrylimide), polyetherimide, atactic polystyrene, polycarbonate, polymethacrylate (for example, polyisobutyl methacrylate, polypropyl methacrylate, polyethyl methacrylate, or polymethyl methacrylate), polyacrylate (for example, polybutyl acrylate or polymethyl acrylate), cellulose derivatives (for example, ethyl cellulose, acetyl cellulose, cellulose propionate, acetyl cellulose butyrate, or cellulose nitrate, polyalkylene polymers (for example, polyethylene, polypropylene, polybutylene, polyisobutylene or poly(4-methyl) pentene), fluorinated polymers (for example, a perfluoroalkoxy resin, polytetrafluoroethylene, a fluorinated ethylene propylene copolymer, polyvinylidene fluoride, or polychlorotrifluoroethylene), chlorinated polymers (for example, polyvinylidene chloride or polyvinyl chloride), polysulfone, polyethersulfone, polyacrylonitrile, polyamide, a silicone resin, an epoxy resin, polyvinyl acetate, polyetheramide, an ionomer resin, elastomers (for example, polybutadiene, polyisoprene, or neoprene), polyurethane, and the like.

As copolymers, for example, copolymers of PEN [for example, copolymers of (a) terephthalic acid or an ester thereof, (b) isophthalic acid or an ester thereof, (c) phthalic acid or an ester thereof, (d) alkane glycol, (e) cycloalkane glycol (for example, cyclohexane dimethanol diol), (f) alkane dicarboxylic acid and/or (g) cycloalkane dicarboxylic acid (for example, cyclohexane dicarboxylic acid) with 2,6-, 1,4-, 1,5-, 2,7-, and/or 2,3-naphthalene dicarboxylic acid or an ester thereof], copolymers of polyalkylene terephthalate [for example, copolymers of (a) naphthalene dicarboxylic acid and an ester thereof, (b) isophthalic acid or an ester thereof, (c) phthalic acid or an ester thereof, (d) alkane glycol, (e) cycloalkane glycol (for example, cyclohexane dimethanol diol), (f) alkane dicarboxylic acid, and/or (g) cycloalkane dicarboxylic acid (for example, cyclohexane dicarboxylic acid) with terephthalic acid or an ester thereof], and styrene copolymers (for example, a styrene-butadiene copolymer or a styrene-acrylonitrile copolymer), 4,4-bibenzoic acid, and ethylene glycol may be used. Alternatively, each layer may include a blend of two or more kinds of the above polymers or copolymers (for example, a blend of SPS and atactic polystyrene).

For the polarizer, examples of particularly preferable combinations of the layer include PEN/co-PEN, polyethylene terephthalate (PET)/co-PEN, PEN/SPS, PET/SPS, PEN/Eastair, and PET/Eastair.

Herein, the "co-PEN" refers to a copolymer or a blend that uses naphthalene dicarboxylic acid as a base. The "Eastair" is polycyclohexane dimethylene terephthalate commercially available from Eastman Chemical Company.

The number of layers laminated is not particularly limited as long as desired optical characteristics can be achieved using the minimum number of layers laminated for economic reasons, and can be appropriately selected according to the purpose. For the polarizer, the number is preferably 10,000 or less, more preferably 5,000 or less, and even more preferably 2,000 or less.

As the polarizer as a laminate of thin films having different types of birefringence, commercially available products can be used. Examples of the commercially available product include DBEF (trade name) manufactured by 3M.

—(3) Wire Grid-type Polarizer—

The wire grid-type polarizer is a polarizer that transmits one side of polarized light and reflects the other side thereof by birefringence of fine metal wires.

The wire grid polarizer is obtained by periodically arranging metal wires. Accordingly, it is used as a polarizer mainly in a terahertz wavelength band. In order that the wire grids function as a polarizer, it is necessary for the interval between wires to be sufficiently smaller than the wavelength of the incident electromagnetic wavelength.

In the wire grid polarizer, metal wires are arranged at the same interval. A component of polarized light that is in parallel with the longitudinal direction of the metal wire is reflected from the wire grid polarizer, and a component of polarized light in a polarizing direction perpendicular thereto is transmitted through the wire grid polarizer As the wire grid-type polarizer, commercially available products can be used. Examples of the commercially available products include a wire grid polarizer 50×50, NT46-636, and the like manufactured by Edmund Optics Inc.

—(4) Thin Film-type Polarizer—

The thin film-type polarizer utilizes incidence angle dependency (Brewster's angle) of a reflectance of dielectric thin film. A thin film-type polarizer having a high degree of power resistance and large area can be produced, and the polarizer is used for a high-power laser device and the like.

Examples of the thin film-type polarizer include those obtained by laminating plural layers of dielectric thin films having different refractive indices. The number of layers to be laminated is preferably 2 to 20 and more preferably 2 to 12.

Examples of the dielectric thin film having a high refractive index include $Sb_2O_3$, $Sb_2S_3$, $Bi_2O_3$, $CeO_2$, $CeF_3$, $HfO_2$, $La_2O_3$, $Nd_2O_3$, $Pr_6O_{11}$, $Sc_2O_3$, SiO, $Ta_2O_5$, $TiO_2$, TiCl, $Y_2O_3$, ZnSe, ZnS, $ZrO_2$, and the like. Among these, $Bi_2O_3$, $CeO_2$, $CeF_3$, $HfO_2$, SiO, $Ta_2O_5$, $TiO_2$, $Y_2O_3$, ZnSe, ZnS, and $ZrO_2$ are preferable, and SiO, $Ta_2O_5$, $TiO_2$, $Y_2O_3$, ZnSe, ZnS, and $ZrO_2$ are particularly preferable.

Examples of materials of the dielectric thin film having a low refractive index include $Al_2O_3$, $BiF_3$, $CaF_2$, $LaF_3$, $PbCl_2$, $PbF_2$, LiF, $MgF_2$, MgO, $NdF_3$, $SiO_2$, $Si_2O_3$, NaF, $ThO_2$, $ThF_4$, and the like. Among these, $Al_2O_3$, $BiF_3$, $CaF_2$, $MgF_2$, MgO, $SiO_2$, and $Si_2O_3$ are preferable, and $Al_2O_3$, $CaF_2$, $MgF_2$, MgO, $SiO_2$, and $Si_2O_3$ are particularly preferable.

The materials of the dielectric thin film are not particularly limited in terms of the atomic ratio and can be appropriately selected according to the purpose. If the concentration of the atmospheric gas at the time of forming film is varied, the atomic ratio can be adjusted.

The method for forming the dielectric thin film is not particularly limited and can be appropriately selected according to the purpose. Examples of the method include a physical vapor deposition process (PVD process) such as ion plating, vacuum vapor deposition using ion beams, and sputtering, a chemical vapor deposition process (CVD process), and the like. Among these, a vacuum vapor deposition process and a sputtering process are preferable, and a sputtering process is particularly preferable.

As the sputtering process, a DC sputtering process by which film is formed at a high rate is preferable. Moreover, in the DC sputtering process, it is preferable to use materials having high conductivity.

As the thin film-type polarizer, commercially available products can be used, and examples of the commercially available products include a TFP series (manufactured by CVI Melles Griot) and the like.

—(5) Birefringent Polarizer—

The birefringent polarizer is a device utilizing the principle that the light which enters a birefringent crystal while forming a certain angle with the optical axis of the crystal is emitted in different directions. This polarizer is used for optical communications. Examples of the birefringent polarizer include a Wollaston prism and the like.

The Wollaston prism is obtained by pasting two birefringent crystals such as calcites to each other by causing the crystal axes thereof to be misaligned. According to the difference in the refractive index based on polarizing properties of light, this prism can divide light.

<Reirradiation Unit>

The reirradiation unit is unit for changing a polarization state of the light reflected from the reflective polarizing plate to reirradiate the reflective polarizer with the light.

It is preferable to change a polarization state by using a birefringent member or a scattering member.

The birefringent member is a member that changes the phase difference of polarization components orthogonal to each other, and examples thereof include those obtained by stretching polymer film, those obtained by polymerizing liquid crystal polymers with a certain alignment, those obtained by performing obliquely vapor-depositing inorganic dielectric materials onto a glass substrate or the like, and the like.

Examples of the scattering member include a diffuser plate (model number HD) manufactured by CVI Melles Griot and the like.

Examples of the reirradiation unit include (1) a diffusive reflector plate, (2) a specular reflector plate, (3) a combination of a birefringent member and a reflector plate, (4) a member functioning as a reflective polarizing plate and circular polarization conversion unit, and the like.

—(1) Diffusive Reflector Plate—

The diffusive reflector plate may be constituted such that fine concavities and convexities are formed on the surface thereof, and the irradiated light is diffused and reflected by the concavities and convexities. The diffusive reflector plate may also be constituted such that a diffusion layer is made by intermixing a large number of reflective beads into the surface thereof, and the irradiated light is diffused and reflected by the reflective beads.

—(2) Specular Reflector Plate—

The specular reflector plate is a reflector plate that reflects light by specular reflection, and can be formed by, for example, vapor-depositing a metal such as silver or aluminum onto a glass substrate or a plastic substrate.

—(3) Combination of Birefringent Member and Reflector Plate—

The birefringent member is a member that changes the phase difference of polarization components orthogonal to each other, and examples thereof include those obtained by stretching polymer film, those obtained by polymerizing liquid crystal polymers with a certain alignment, those obtained by performing obliquely vapor-depositing inorganic dielectric materials onto a glass substrate or the like, and the like.

The reflector plate may be a diffusive or specular reflector plate.

(4) Member Functioning as Reflective Polarizing Plate and Circular Polarization Conversion Unit If the member functioning as a reflective polarizing plate and circular polarization conversion unit, a high efficiency can be obtained. For example, it is possible to prevent the decrease in efficiency caused by surface reflection of the respective members and prevent the decrease in efficiency resulting from error in assembly caused when the members are integrated.

Examples of the member functioning as a reflective polarizing plate and circular polarization conversion unit include a circularly polarized light-reflecting plate having a cholesteric liquid crystal structure, a circularly polarized light-reflecting plate composed of a linearly polarized light-reflecting plate and a $\lambda/4$ wave plate, and the like.

<Circular Polarization Conversion Unit>

The circular polarization conversion unit is unit for converting the light transmitted through the reflective polarizing plate into circularly polarized light.

The polarization state of light can be indicated by the sum of right circular polarization and left circular polarization. For example, when a right circular polarization component and a left circular polarization component have the same intensity, the sum thereof becomes linear polarization, and by the bearing determined according to the phase difference between left and right circular polarization, the electric vector thereof vibrates. When there is a difference in the intensity between the right and left circular polarization components, elliptical polarization occurs, and when there is only one component, perfect circular polarization occurs.

Herein, provided that the intensity of the right circular polarization component of light is $I_R$, and the intensity of the left circular polarization component is $I_L$, $|I_R-I_L|/(I_R+I_L)$ is defined as a degree of circular polarization.

Regarding the sense of circular polarization, when light is viewed in a direction in which it comes straight toward the viewer, if the leading end of the electric field vector turns clockwise with the passage of time, this is right-hand polarization, and if the leading end turns counterclockwise, this is left-hand polarization.

The polarization state of each wavelength of the light emitted from the light-emitting light source can be measured using a spectroradiometer or a spectrometer on which a circular polarizing plate is mounted. In this case, the intensity of the light measured through a right-circular polarizing plate corresponds to $I_R$, and the intensity of the light measured through a left-circular polarizing plate corresponds to $I_L$. Moreover, general light sources such as an incandescent light bulb, a mercury lamp, a fluorescent lamp, and an LED practically emit natural light, but characteristics of the circular polarizing plate, which is mounted on the above sources, causing polarization of the polarization state regulation member can be measured using, for example, a polarization phase difference analyzer AxoScan manufactured by AXOMETRICS.

As the circular polarization conversion unit, birefringent members having a property in which the refractive index varies with the polarization direction are used.

Examples of the circular polarization conversion unit include wave plates represented by the following Formula $(\lambda/4) \times (2n+1)$ [here, n represents an integer] and the like. Among these, a $\lambda/4$ wave plate, a $-\lambda/4$ wave plate, 3 $\lambda/4$ wave plate, and $-3\ \lambda/4$ wave plate are preferable in view of accuracy, and a $\lambda/4$ wave plate and a $-\lambda/4$ wave plate are particularly preferable.

The $\lambda/4$ wave plate is not particularly limited and can be appropriately selected according to the purpose, and examples thereof include stretched polycarbonate film, stretched norbornene-based polymer film, transparent film that contains aligned inorganic particles such as strontium carbonate having birefringence, thin film obtained by obliquely vapor-depositing an inorganic dielectric substance on a support, and the like.

Examples of the $\lambda/4$ wave plate include (1) a retardation plate which is described in JP1993-27118A (JP-H05-27118A) and JP1993-27119A (JP-H05-27119A) and is obtained by laminating birefringent film having a large extent of retardation on birefringent film having a small extent of retardation such that optical axes thereof become orthogonal to each other, (2) a retardation plate which is described in JP1998-68816A (JP-H10-68816A) and obtained by laminating polymer film having a $\lambda/4$ wavelength in a specific wavelength on polymer film made of the same material as the above film and having a $\lambda/2$ wavelength in the same wavelength to obtain a $\lambda/4$ wavelength in a wide wavelength region, (3) a retardation plate which is described in JP1998-90521A (JP-H10-90521A) and can achieve a $\lambda/4$ wavelength in a wide wavelength region by laminating two sheets of polymer films on each other, (4) a retardation film which can achieve a $\lambda/4$ wavelength in a wide wavelength region by using modified polycarbonate film described in WO00/26705A and, (5) a retardation plate which can achieve a $\lambda/4$ wavelength in a wide wavelength region by using cellulose acetate film described in WO00/65384A, and the like.

As the $\lambda/4$ wave plate, commercially available products can be used. Examples of the commercially available products include a product having a trade name of Pureace WR (manufactured by TEIJIN LIMITED), and the like.

<Other Members>

The circular polarization illumination device of the present invention can optionally further includes a heat ray-shielding layer, a reflective layer, a heat ray-transmitting layer, a heat-conductive material, a polarization resolution inhibitory wall, and the like, as the above other members.

<Use>

The circular polarization illumination device of the present invention can promote the growth of plants by irradiating right-circularly polarized light at a large light amount from a light source of right-circularly polarized light with a high efficiency and can inhibit the growth of plants by irradiating left-circularly polarized light at a large amount from a light source of left-circularly polarized light with a high efficiency. Accordingly, as described below, the circular polarization illumination device can be widely used in various fields such as streetlamps, plant factories, the fishing industry, health care, and a medical field. Among these, the circular polarization illumination device is preferably used for a plant growth regulation method described later.

Herein, the mechanism relating to the circular polarization illumination device of the present invention is assumed to be as below.

Phytochromobilin and flavine as choromophores contained in photoreceptors such as phytochrome, cryptochrome, phototropin, and ZTL that are involved in the promotion and inhibition of flower bud formation, growth inhibition, and the like of plants are optically active compounds. Accordingly, these compounds exhibit absorption dichroism with respect to circularly polarized light around the light absorption wavelength region. That is, the light absorbed by the photoreceptor is left- or right-circularly polarized light. Compared to this light, polarized light having another sense is not easily absorbed, so even if this type of light is irradiated, it is difficult to induce the photoreceptor to function. Consequently, it is assumed that when only one of the left- and right-circularly polarized light is irradiated respectively, a phenomenon in which a difference is made in the growth may be caused. Here, the absorption dichroism is a phenomenon that can be confirmed in a solution system of the laboratory level, and it is generally considered that the above phenomenon cannot be observed in practice since a polarization state disappears due to scattering caused by intracellular substances before the polarized light reaches the chromophores. However, surprisingly, in the present invention, it was found that even in leaves or stems where the chromophores are present, the growth of a plant can be regulated according to the polarization state of the irradiated light.

The phytochrome involved in photoperiodism of plants includes a red light absorption type having absorption maximum at around 650 nm and a far-red light absorption type having absorption maximum at around 750 nm. By being irradiated with light at around 650 nm, the red light absorption type is converted into the far-red light absorption type. On the other hand, by being irradiated with light at around 750 nm, the far-red light absorption type is converted into the red light absorption type. Moreover, with the passage of time in a dark state, the far-red light absorption type is converted into the red light absorption type. The amount of the far-red light absorption type produced by the reaction regulates the flowering time. If the reaction is artificially regulated, it is possible to regulate the flowering time by, for example, night illumination performed in cultivation of chrysanthemum. As the illumination lamp, if the light source of the illumination device of the present invention that irradiates right-circularly polarized light the phytochrome absorbs only in the absorption wavelength region of the phytochrome is used, it is possible to suppress the consumption of required power without diminishing the effect of the electric illumination.

—Nocturnal Harmful Insects—

In order to control armyworms as nocturnal harmful insects that are typical harmful insects of cabbage, spinach, and the like, a method of illuminating the vicinity of the crop in the night is used. However, this leads to a problem that flower buds are formed by the phytochrome reacting to the illumination light, and the product value is markedly lowered. As a countermeasure for this, sometimes an illuminating lamp free of red-light component is used. However, since this is an unnatural color shade, a weird atmosphere is created in the production area.

As the illuminating lamp for the above purpose, if the light source of the illumination device of the present invention that irradiates left-circularly polarized light the phytochrome does not absorb only in the absorption wavelength region of the phytochrome is used, it is possible to make pest control compatible with inhibition of bolting even with white illumination light that does not make ordinary people feel a sense of incompatibility when they see the light.

—Streetlamp—

Moreover, there is a problem that due to the night illumination caused by streetlamps of farm roads in a farming area cultivating rice, a flowering time of rice is delayed, and the yield and quality decrease. Therefore, the streetlamps are covered so as to prevent light from hitting fields and paddies, or the illuminating lamp free of red-light component as described above is under examination. However, the former method has a problem with safety since the vicinity of the road cannot be recognized, and the latter method creates a weird atmosphere due to unnatural color shade as described above. These problems may arise not only in rice cultivation but also in various crops. In order to solve these problems, if the light source as the illumination device of the present invention that irradiates left-circularly polarized light the phytochrome does not absorb only in the absorption wavelength region of the phytochrome is used, it is possible to provide streetlamps that do not negatively affect the growth of plants, use white illumination light which is bright and does not cause incompatibility for the eyes, and do not need to be subjected to light shielding.

The illumination device of the present invention focuses on the circular polarization absorption dichroism of plants, and irradiates natural light as is outside the wavelength band thereof. Accordingly, it is a light source which makes it possible to reduce the number of members for regulating the polarization state without reducing the light amount required for photosynthesis or the like, and can irradiate light of natural color shade without decreasing light utilization efficiency. Considering this principal of action, if the light having a wavelength required for green leaves is irradiated in a non-polarized state, and the light involved in the growth of stems is regulated to be circularly polarized light, it is possible to produce dwarfed compact potted flowers which have a low height and green leaves having a high product quality. Likewise, if a plant is irradiated with strong polarized light in the absorption wavelength of the chromophore, or inversely, irradiated with polarized light not absorbed, the plant may suffer from a certain type of stress. Therefore, there is a possibility that increase in the production of medicinal ingredients of medicinal herbs may be promoted, and good taste, nutritive components, aromatic components, and a ratio between components of secondary metabolites such as antioxidants of plants can be regulated.

Moreover, in a plant disease control method, which has drawn attention recently, for enhancing resistance against diseases by means of irradiating plants with UV light, if only the circularly-polarized light having effective sense is irradiated, it may be possible to reduce damage caused by UV rays by decreasing the total irradiation dose. Conversely, there is a possibility that optical repairability of DNA and other blue light bioswitch can be effectively activated at a low illuminance.

There are various types of plants and various types of chromophores on earth. Therefore, it is important to vary the wavelength band of circularly-polarized light and sense according to the purpose of regulation. Needless to say, sometimes it is preferable to simultaneously irradiate circularly polarized light having different sense, such as a case where right-circularly polarized light is irradiated in a certain wavelength, and a left-circularly polarized light is irradiated in another wavelength band. The illumination device of the present invention can also be used for the above purpose.

The illumination device of the present invention can be used in different modes by changing the wavelength band for conversion into polarized light and conversion members according to stages of growth process of plants, such as stages of dormancy, germination, maturation of seedling, cell elongation, and flower bud differentiation. Moreover, it is also possible to regulate the timing of irradiation, the light intensity, and the polarization state according to the circadian rhythm. In addition, the illumination device can be used in different modes by emitting pulsed light or by irradiating light in different polarization states according to the site of the plant to be irradiated. Furthermore, in a plant factory, light irradiation performed by the illumination device of the present invention may be combined with the regulation of humidity, temperature, and gas concentration.

—Fishing Industry and the Like—

There is a report reporting that some kinds of insects, crustaceans, and squids can recognize circularly-polarized light.

Moreover, there is a possibility that irradiation of circularly-polarized light into the sea may effectively gather fishes themselves to be caught and small fishes, small shrimps, plankton, and the like as prey of those fishes or selectively gather these, whereby only the target fishes that gather around the prey may be caught. At this time, the illumination device of the present invention can be preferably used as an illumination device.

(Plant Growth Regulation Method)

The plant growth regulation method of the present invention uses the illumination device of the present invention as a source of light irradiation.

In this case, for 50% of the period from germination to harvest of a plant, it is preferable to irradiate the plant with the illumination device of the present invention.

The plant growth regulation method includes plant growth promotion and plant growth inhibition.

The plant growth promotion means growth of plant body caused by elongation of plant length, stem length, internode, and the like, increase in length of lateral branches, and the like.

By the plant growth promotion action, the weight and length of crops can be increased rapidly, so the productivity increases. Moreover, large-sized crops can be easily cultivated. In addition, crops are rapidly matured in breeding, and this brings an advantage that the number of times of alternation of generations can be increased.

The plant growth inhibition means dwarfing of plant body by inhibition of elongation of plant length, stem length, internode, and the like, inhibition of the length of lateral branches, and the like. Moreover, dwarfing means a phenomenon in which stems or branches of a plant become thick and strong and resistant to unfavorable conditions of nature such as wind and rain, and the amount of nutrients such as chlorophyll and vitamin per unit area increases.

If plant height is decreased by the plant growth inhibition action, this brings an advantage that the plant becomes resistant to wind damage caused by typhoons and the like and does not easily fall down even if the number of grains increase. For example, in a case of rice, in order to increase the number of lanes for planting seedlings, it is possible to further increase the density of seedlings planted per unit area. If the plant growth inhibition action is applied to fruit trees (banana, mango, and the like) or palm trees (date, coconut, and the like) having a height of several meters, the fruits can be more easily harvested. Moreover, if some plants are smaller than ordinary plants, this brings advantages that the product quality is heightened in cut flowers, ornamental foliage plants, and bonsai plants, and buyers become interested in the plants, and the like.

In the plant growth regulation method of the present invention, irradiation timing regulation (circadian rhythm and growth process (stages of dormancy, germination, maturation of seedling, cell elongation, and the like)), pulsated illumination, and the wavelength band for conversion into polarized light are preferably varied with the circadian rhythm and growth process. According to the plant and purpose, the timing regulation, pulsated illumination, and the wavelength band for conversion into polarized light are changed, and partial illumination is performed. Moreover, the above may be regulated in combination with the regulation of humidity, temperature, gas concentration, illuminance, and irradiation time.

Specifically, even in flower bud formation by day length, a regression reaction, chloroplast movement, gap opening, biosynthesis of flavonoids, and control of plant diseases (method of enhancing resistance to diseases by irradiating a plant with UV), UV damage can be reduced by means of irradiation of circularly-polarized light that is effective for one component.

Examples of the plant growth regulation method include the regulation of bending of light, on and off of gene transcription, and gene expression, the regulation of secondary metabolites (nutritive components, aromatic components, good taste, antioxidants, and medicinal ingredients), causing stress, optical repairability of DNA, blue light bioswitch, and the like.

—Subject Plants—

The subject plants used for the plant growth regulation method are not particularly limited and can be appropriately selected according to the purpose. Examples thereof include vegetables of Cucurbitaceae, Solanaceae, Fabaceae, Rosaceae, Brassicaceae, Asteraceae, Apiaceae, Chenopodiaceae, Poaceae, Malvaceae, Araliaceae, Labiatae, Zingiberaceae, Nymphaeaceae, and Araceae, cut flowers or ornamental flowers of potted plants of Asteraceae, Rosaceae, Araceae, Caryophyllaceae, Brassicaceae, Plumbaginaceae, Gentianaceae, Scrophulariaceae, Fabaceae, Paeoniaceae, Iridaceae, Solanaceae, Amaryllidaceae, Orchidaceae, Agavaceae, Cornaceae, Rubiaceae, Salicaceae, Ericaceae, Oleaeceae, Magnoliaceae, Primulaceae, Begoniaceae, Labiatae, Geraniaceae, Crassulaceae, Ranunculaceae, Gesneriaceae, Cactaceae, ferns, Araliaceae, Moraceae, Commelinaceae, Bromeliaceae, Marantaceae, Euphorbiaceae, Piperaceae, Euphorbia pekinensis, Saxifragaceae, Onagraceae, Malvaceae, Myrtaceaea, Theaceae, and Nyctaginaceae, fruit trees of Rosaceae, Vitaceae, Moraceae, Ebenaceae, Ericaceae, Lardizabalaceae, Actinidiaceae, Passifloraceae, Rutaceae, Anacardiaceae, Bromeliaceae, and Mytaceae, and seaweeds.

More specific examples thereof include vegetables such as cucumber, melon, squash, bitter melon, zucchini, water melon, oriental pickling melon, wax gourd, sponge cucumber, spaghetti squash, tomato, bell pepper, pepper, eggplant, pepino, sweet pepper, peas, kidney beans, cowpeas, green soybeans, fava beans, winged beans, podded peas, tepary beans, hyacinth bean, strawberry, corn, okra, broccoli, white radish sprouts, watercress, Japanese mustard spinach, pickled greens, lettuce, Japanese sweet coltsfoot, garland chrysanthemum, edible chrysanthemum, celery, parsley, Japanese honewort, Japanese parsley, green onion, Chinese chive, asparagus, spinach, saltwort, udo, shiso, ginger, Japanese radish, turnip, horseradish, radish, rutabaga, kochab, garlic, Japanese leek, lotus roots, and taro; ornamental flowers such as aster, rhodanthe, thistle, gillyflower, stock, cauliflower, statice, Texas bluebell, snapdragon, sweetpea, iris, chrysanthemum, liatris, gerbera, marguerite, Gymnaderia savatierti, Shasta daisy, carnation, Gypsophilia paniculata, gentian, Chinese peony, winter cherry, lion, dahlia, calla, gladiolus, iris, freesia, tulip, daffodil, amaryllis, cymbidium, dracaena, rose, Japanese quince, cherry, peach, Japanese apricot, spirea, raspberry, Japanese rowan, cornel, Cornus officinalis, Chinese ixora, bouvardia, willow, azelea, weeping forsythia, lily magnolia, cineraria, dim orphotheca, primula, petunia, begonia, gentian, coleus, geranium, pelargonium, rokeya, anthurium, clematis, lily of the valley, saintpaulia, cyclamen, ranunculus, gloxinia, dendrobium, cattleya, Phalaenopsis, vanda, epidendrum, oncidium, schlumbergera, Schlumbergera russelliana, epiphyllum, kalanchoe, nephrolepis, adiantum, taniwatari, pothos, dieffenbachia, spathiphyllum, syngonium, chlorophytum, schefflera, ivy, hevea, dracaena, cordyline, bridal veil, bromeliads, calathea, croton, peperomia, poinsettia, hydrangea, fuchsia, hibiscus, gardenia, broom featree, camellia, bougainvillea, and tree peony; fruit trees such as Japanese pears, peach, turret, Japanese plum, apple, prune, nectarine, apricot, raspberry, Japanese apricot, grape, fig, persimmon, blueberry, akebi, kiwifruit, passionfruit, loquat, Satsuma mandarin, marcollette, lemon, yuzu, fingered citron, citrus hassaku, citrus grandis, flower yuzu, cumquat, Seminole, citrus iyo, navel orange, encore, nova, citrus tamurana, lime, citrus sudachi, citrus sphaerocarpa, citrus grandis, citrus tankan, mango, pineapple, and guava; seaweeds; and the like.

Among these, leafy vegetables and Japanese mustard spinach of pickled greens belonging to Brassicaceae are particularly preferable.

According to the plant growth regulation method of the present invention, prevention of harmful insects and inhibition of bolting (phenomenon in which a scape arises after flower bud differentiation) become compatible with each other, regulation of flowering time and regulation and promotion of the growth of plants (vegetables, fruits, and the like) can be conducted efficiently, and light pollution can be prevented.

EXAMPLES

Hereinafter, examples of the present invention will be described, but the present invention is not limited to the examples.

Example 1

—Preparation of Circular Polarization Illumination Device—

A commercially available white LED lamp with a diffusive reflector plate (manufactured by Beautiful Light Technology Corporation, PAR30) as a light-emitting light source, a total reflection polarizer (wire grid polarizing filter, manufactured by Edmund Optics Inc.), a $\lambda/4$ wave plate (manufactured by Edmund Optics Inc.) were arranged as shown in FIG. 1, thereby preparing a circular polarization illumination device of Example 1.

Thereafter, the prepared circular polarization illumination device was evaluated in terms of various properties in the following manner. The results are shown in Table 1.

<Measurement of 1-Pass p-polarized Light Transmittance, 1-Pass s-polarized Light Transmittance, Diffuse Reflectance, and Degree of Change into Polarized Light>

The 1-pass p-polarized light transmittance (%), 1-pass s-polarized light transmittance (%), diffuse reflectance (%), and a degree of change into polarized light were measured using a spectrophotometer (model number: USB2000, manufactured by Ocean Optics Corporation).

<Overall p-polarized Light Transmittance>

The overall p-polarized light transmittance (%) was measured using a spectrophotometer (model number: USB2000, manufactured by Ocean Optics Corporation) and evaluated based on the following criteria.

[Evaluation Criteria]
A: 60% or more
B: 50% or more and less than 60%
C: 40% or more and less than 50%
D: less than 40%

Example 2

—Preparation and Evaluation of Circular Polarization Illumination Device—

Figure 2:
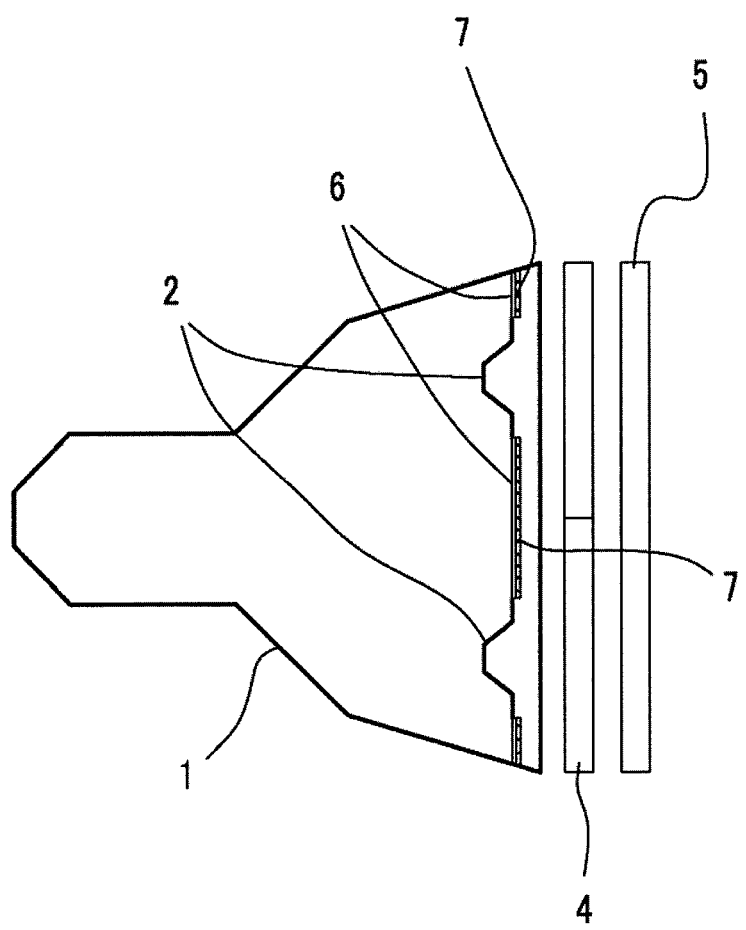
FIG. 2 is a schematic view showing the constitution of a circular polarization illumination device of Example 2.

A circular polarization illumination device of Example 2 as shown in FIG. 2 was prepared in the same manner as in Example 1, except that a specular reflector plate (aluminum foil) and a birefringent plate (retardation plate) were pasted onto the reflective surface of the LED lamp in Example 1.

The obtained circular polarization illumination device was evaluated in terms of various properties in the same manner as in Example 1. The results are shown in Table 1.

Example 3

—Preparation and Evaluation of Circular Polarization Illumination Device—

A circular polarization illumination device of Example 3 was prepared in the same manner as in Example 1, except that a specular polarizing plate (aluminum foil) was not provided in Example 2.

The obtained circular polarization illumination device was evaluated in terms of various properties in the same manner as in Example 1. The results are shown in Table 1.

Example 4

—Preparation and Evaluation of Circular Polarization Illumination Device—

A circular polarization illumination device of Example 4 was prepared in the same manner as in Example 2, except that a birefringent plate (retardation plate) was not provided in Example 2.

The obtained circular polarization illumination device was evaluated in terms of various properties in the same manner as in Example 1. The results are shown in Table 1.

Comparative Example 1

—Preparation and Evaluation of Circular Polarization Illumination Device—

A circular polarization illumination device of Comparative example 1 was prepared in the same manner as in Example 1, except that the total reflection polarizer (wire grid polarizing filter, manufactured by Edmund Optics Inc.) is replaced with an absorptive polarizer (polarizing film, manufactured by Edmund Optics Inc.) in Example 1.

The obtained circular polarization illumination device was evaluated in terms of various properties in the same manner as in Example 1. The results are shown in Table 1.

plane, thereby preparing an illumination device irradiating right-circularly polarized light.

Figure 4:
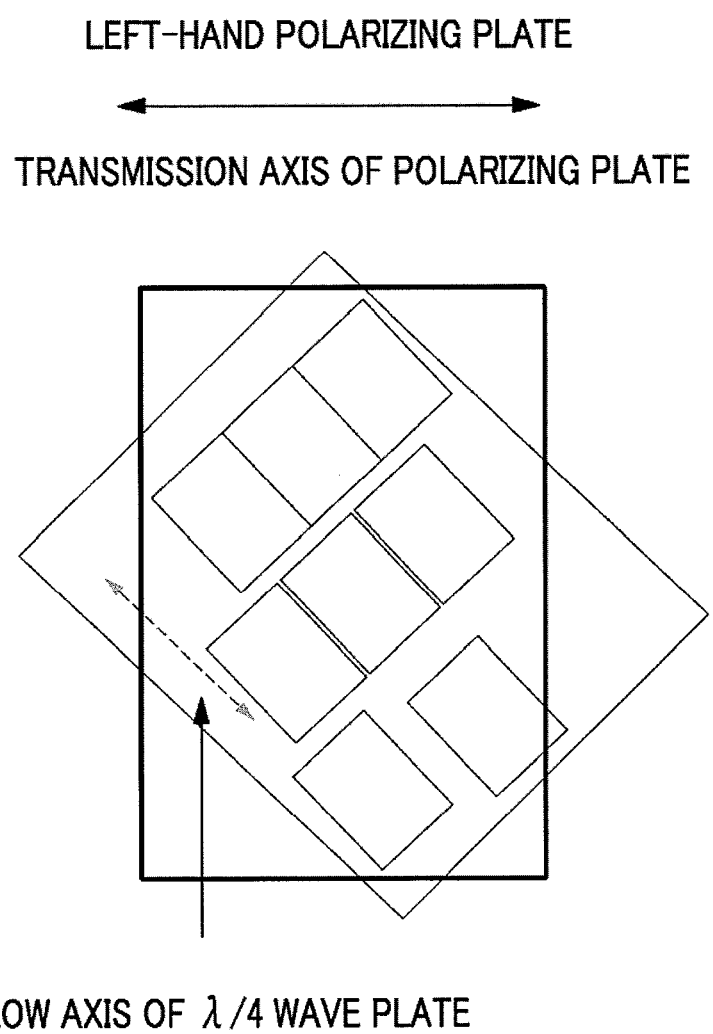
FIG. 4 is a schematic view showing a method of converting into left-circularly polarized light.
Figure 5:
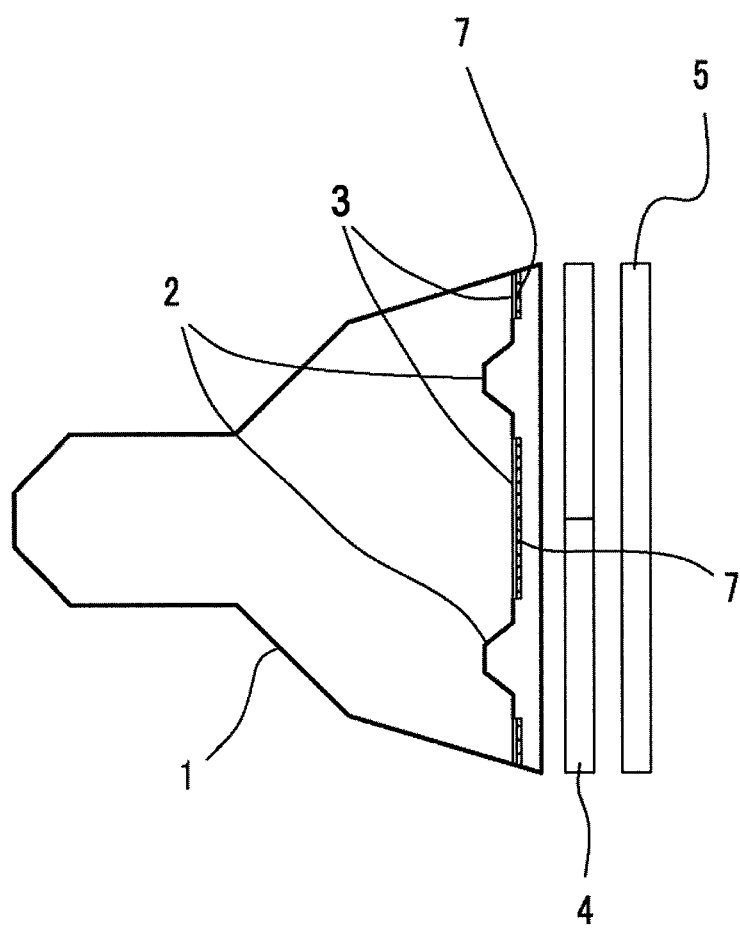
FIG. 5 is a schematic view showing the constitution of a circular polarization illumination device according to an embodiment of the present invention.

On the other hand, as shown in FIG. 4, a $\lambda/4$ wave plate was pasted to a polarizing plate such that the polarizing plate became light-incident plane, and the $\lambda/4$ wave plate became an emission plane, thereby preparing an illumination device irradiating left-circularly polarized light.

Subsequently, by using the respective illumination devices having undergone conversion of the polarization state, Japanese mustard spinach was cultivated by being continuously irradiated with the light for 38 days in an environment of 25° C. Thereafter, the weight of the spinach was measured to determine the weight increment compared to before irradiation to evaluate a dwarfing effect and a growth promotion effect based on the following criteria. The results are shown in Table 2.

TABLE 1

|  | Example 1 | Example 2 | Example 3 | Example 4 | Comparative example 1 |
|---|---|---|---|---|---|
| Polarizer | Total reflection polarizer | Total reflection polarizer | Total reflection polarizer | Total reflection polarizer | Absorptive polarizer |
| Reflector plate | Diffusive reflector plate | Specular reflector plate | Diffusive reflector plate | Specular reflector plate | Diffusive reflector plate |
| Conversion into birefringence | Diffusive reflector plate | Birefringent plate | Birefringent plate | None | Birefringent plate |
| Conversion into circularly polarized light | $\lambda/4$ wave plate | $\lambda/4$ wave plate | $\lambda/4$ wave plate | $\lambda/4$ wave plate | $\lambda/4$ wave plate |
| 1-pass p-polarized light transmittance (%) | 46 | 46 | 46 | 46 | 46 |
| 1-pass s-polarized light transmittance (%) | 46 | 46 | 46 | 46 | 0 |
| Diffuse reflectance (%) | 90 | 90 | 90 | 90 | 90 |
| Degree of polarization change | 80 | 80 | 90 | 25 | 80 |
| Overall | 69 | 69 | 73 | 51 | 46 |
| p-polarized light transmittance (%) | A | A | A | B | C |

Examples 5 and 6 and Comparative example 2

—Plant Growth Regulation—

Illumination devices were prepared by converting the polarization state of the circular polarization illumination device of Example 3 into right-hand polarization (Example 5), left-hand polarization (Example 6), and linear polarization (Comparative example 2) respectively.

That is, "regarding the sense of circular polarization, when light is viewed in a direction in which it comes straight toward the viewer, if the leading end of the electric field vector turns clockwise with the passage of time, this is right-hand polarization, and if the leading end turns counterclockwise, this is left-hand polarization." The illumination device was prepared by converting the polarization state into right-hand polarization (Example 5), left-hand polarization (Example 6), and linear polarization (Comparative example 2) respectively. The preparation method is as follows.

Figure 3:
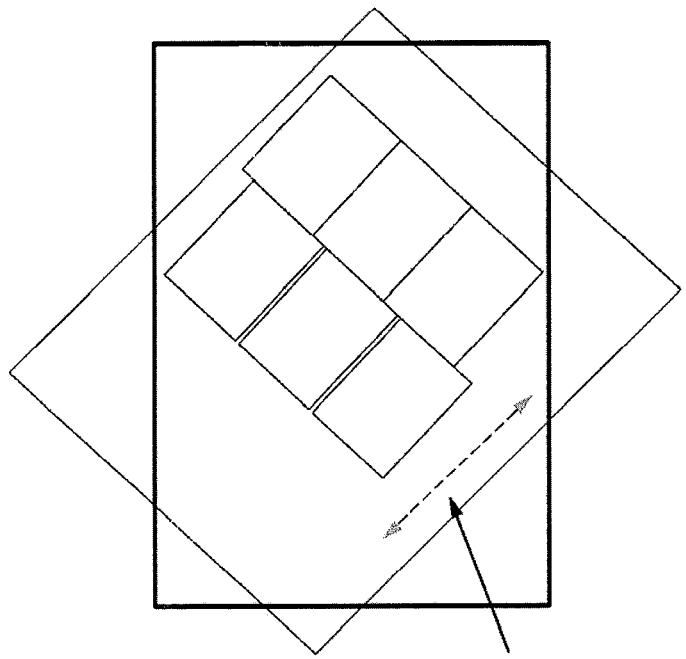
FIG. 3 is a schematic view showing a method of converting into right-circularly polarized light.

As shown in FIG. 3, a $\lambda/4$ wave plate was pasted to a polarizing plate such that the polarizing plate became light-incident plane, and the $\lambda/4$ wave plate became an emission <Dwarfing Effect>

Regarding the weight increase of the plant in Comparative example 2, a case where 20% or more of weight reduction was caused was evaluated to be "effective for dwarfing", and a case where a weight reduction of 0% or more and less than 20% was caused was evaluated to be "ineffective for dwarfing".

<Growth Promotion Effect>

Regarding the weight increase of the plant in Comparative example 2, a case where 20% or more of weight increase was caused was evaluated to be "effective for growth promotion", and a case where a weight increase of 0% or more and less than 20% was caused was evaluated to be "ineffective for growth promotion".

TABLE 2

|  | Example 5 | Example 6 | Comparative example 2 |
|---|---|---|---|
| Illumination device | Example 3 | Example 3 | Example 3 |
| Polarization state | Right-hand polarization | Left-hand polarization | Linear polarization |

TABLE 2-continued

|  | Example 5 | Example 6 | Comparative example 2 |
|---|---|---|---|
| Increased weight of Japanese mustard radish (g) | 13 | 7 | 10 |
| Dwarfing effect | Ineffective | Effective | Ineffective |
| Growth promotion effect | Effective | Ineffective | Ineffective |

The circular polarization illumination device of the present invention can irradiate right-circularly polarized light at a large light amount from a light source of right-circularly polarized light with a high efficiency and can irradiate left-circularly polarized light at a large light amount from a light source of left-circularly polarized light with a high efficiency. Accordingly, prevention of harmful insects and inhibition of bolting (phenomenon in which a scape arises after flower bud differentiation) become compatible with each other, regulation of flowering time and inhibition and promotion of the growth of plants (vegetables, fruits, andthe like) can be conducted efficiently, and light pollution can be prevented. Therefore, the circular polarization illumination device can be widely used in various fields such as streetlamps, plant factories, the fishing industry, health care, and a medical field.

REFERENCE NUMBERS

1. LED lamp
2. LED
3. Diffusive reflector plate
4. Total reflection polarizer
5. λ/4 wave plate
6. Specular reflector plate
7. Birefringent plate (retardation plate)

What is claimed is:

1. A plant growth regulation method comprising irradiating a plant with a source of light irradiation,
    wherein the source of light irradiation is a circular polarization illumination device,
    the circular polarization device comprising:
        a light-emitting light source;
        a reflective polarizing plate that transmits one of a plurality of polarization components of incident light from the light-emitting light source and reflects a different one of the plurality of polarization components, wherein said one of the plurality of polarization components is p-polarized light, and said different one of the plurality of polarization components is s-polarized light;
        a reirradiation unit for changing a polarization state of light reflected from the reflective polarizing plate to reirradiate the reflective polarizing plate with the light; and
        a circular polarization conversion unit for converting light having been transmitted through the reflective polarizing plate into circularly polarized light,
    wherein:
        the reflective polarizing plate is any one of a total reflection-type polarizer, a polarizer as a laminate of thin films having different types of birefringence, a wire grid-type polarizer, a thin film-type polarizer, and a birefrigent polarizer;
        the circular polarization conversion unit is a λ/4 wave plate, and
        plant growth is promoted by 20% or more if the plant is irradiated with right-circularly polarized light and plant growth is promoted by less than 20% if the plant is irradiated with left-circularly polarized light.

2. The plant growth regulation method according to claim 1, wherein the reflective polarizing plate is any one of a polarizer as a laminate of thin films having different types of birefringence or a wire grid-type polarizer.

3. The plant growth regulation method according to claim 1, wherein the reirradiation unit is any one of a diffusive reflector plate, a specular reflector plate, and a combination of a birefringent member and a reflector plate.

4. The plant growth regulation method according to claim 1, wherein the reirradiation unit is a combination of a birefringent member and a reflector plate.

5. The plant growth regulation method according to claim 4, wherein the reflector plate is any one of a specular reflector plate or a diffusive reflector plate.

6. The plant growth regulation method according to claim 1, wherein the light-emitting light source is a white lamp.

7. The plant growth regulation method according to claim 1, wherein the method comprises irradiating the plant with the source of light irradiation for 50% or more of a period from germination to harvest of the plant.

* * * * *